US012371559B2

(12) United States Patent
An et al.

(10) Patent No.: US 12,371,559 B2
(45) Date of Patent: *Jul. 29, 2025

(54) ASA-BASED RESIN COMPOSITION, MOLDED ARTICLE INCLUDING ASA-BASED RESIN COMPOSITION, AND METHOD OF MANUFACTURING MOLDED ARTICLE

(71) Applicant: LG CHEM, LTD., Seoul (KR)

(72) Inventors: Yong Hee An, Daejeon (KR); Tae Hoon Kim, Daejeon (KR); Chun Ho Park, Daejeon (KR); Da Eun Sung, Daejeon (KR); Wangrae Cho, Daejeon (KR); Ho Hoon Kim, Daejeon (KR); Jeongmin Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 845 days.

This patent is subject to a terminal disclaimer.

(21) Appl. No.: 17/435,511

(22) PCT Filed: Sep. 28, 2020

(86) PCT No.: PCT/KR2020/013200
§ 371 (c)(1),
(2) Date: Sep. 1, 2021

(87) PCT Pub. No.: WO2021/071156
PCT Pub. Date: Apr. 15, 2021

(65) Prior Publication Data
US 2022/0135786 A1  May 5, 2022

(30) Foreign Application Priority Data

Oct. 7, 2019 (KR) .................. 10-2019-0123821
Sep. 25, 2020 (KR) .................. 10-2020-0124402

(51) Int. Cl.
C08L 51/04 (2006.01)
B29B 11/08 (2006.01)
B29B 11/10 (2006.01)
B29K 33/00 (2006.01)
B29K 96/02 (2006.01)
C08L 33/12 (2006.01)

(52) U.S. Cl.
CPC ............... *C08L 51/04* (2013.01); *C08L 33/12* (2013.01); *B29B 11/08* (2013.01); *B29B 11/10* (2013.01); *B29K 2033/12* (2013.01); *B29K 2096/02* (2013.01); *C08L 2205/035* (2013.01)

(58) Field of Classification Search
CPC ....... C08L 2205/03; C08L 33/12; C08L 51/04
See application file for complete search history.

(56) References Cited

U.S. PATENT DOCUMENTS

| 2003/0162895 A1 | 8/2003 | Gaggar et al. |
| 2016/0002455 A1 | 1/2016 | Chung et al. |
| 2019/0382574 A1 | 12/2019 | An et al. |

FOREIGN PATENT DOCUMENTS

| CN | 103958599 A | 7/2014 |
| CN | 104066757 A | 9/2014 |
| CN | 109071912 A | 12/2018 |
| JP | 2002-046214 A | 2/2002 |
| JP | 2006509048 A | 3/2006 |
| JP | 2014-533763 A | 12/2014 |
| JP | 2015-522084 A | 8/2015 |
| JP | 2018507923 A | 3/2018 |
| KR | 10-2004-0049066 A | 6/2004 |
| KR | 10-2009-0095764 A | 9/2009 |
| KR | 10-2014-0096748 A | 8/2014 |
| KR | 10-2017-0057205 A | 5/2017 |
| KR | 10-2013-0078199 A | 9/2017 |
| KR | 10-2017-0107171 A | 9/2017 |
| KR | 10-2018-0050596 A | 5/2018 |
| KR | 10-2018-0052254 A | 5/2018 |
| KR | 10-2018-0075743 A | 7/2018 |
| KR | 10-2019-0064989 A | 6/2019 |

OTHER PUBLICATIONS

Machine translation of KR20180075743. (Year: 2018).*
Extended European Search Report for European Patent Application No. 20874125.6; dated Jun. 8, 2022; 8 pages.
International Search Report and Written Opinion issued in corresponding International Patent Application No. PCT/KR2020/013200, dated Sep. 28, 2020.
Japanese Office Action issued in corresponding Japanese Patent Application No. 2021-559361, dated Dec. 5, 2022, 4 pages.
Chinese First Office Action for Chinese Patent Application No. 202080016926.3; dated Jun. 10, 2022; 7 pages.

* cited by examiner

*Primary Examiner* — Wenwen Cai
(74) *Attorney, Agent, or Firm* — Morgan, Lewis & Bockius LLP

(57) ABSTRACT

Disclosed is an ASA resin composition, a molded article including the ASA resin composition, and a method of manufacturing the molded article. Also disclosed is an ASA resin composition including 20 to 47% by weight of an acrylate-aromatic vinyl compound-vinyl cyanide compound graft copolymer containing acrylate rubber having an average particle diameter of 50 to 150 nm as a core; 23 to 55% by weight of an alkyl methacrylate-aromatic vinyl compound-vinyl cyanide compound copolymer; and 25 to 45% by weight of a poly(alkyl methacrylate) resin, a molded article including the ASA resin composition, and a method of manufacturing the molded article. Also disclosed is an ASA resin composition having excellent colorability and transparency even at a processing thickness of a predetermined value while having excellent mechanical properties and processability, a molded article including the ASA resin composition, and a method of manufacturing the molded article are provided.

8 Claims, No Drawings

ASA-BASED RESIN COMPOSITION, MOLDED ARTICLE INCLUDING ASA-BASED RESIN COMPOSITION, AND METHOD OF MANUFACTURING MOLDED ARTICLE

CROSS-REFERENCE TO RELATED APPLICATIONS

This application claims priority to Korean Patent Application No. 10-2019-0123821, filed on Oct. 7, 2019, and Korean Patent Application No. 10-2020-0124402, re-filed on Sep. 5, 2020, based on the priority of the above patent, in the Korean Intellectual Property Office, the disclosures of each of which are incorporated herein by reference.

TECHNICAL FIELD

The present invention relates to an ASA-based resin composition, a molded article including the ASA-based resin composition, and a method of manufacturing the molded article. More particularly, the present invention relates to an ASA-based resin composition having excellent colorability and transparency even at a processing thickness of a predetermined value or more while having excellent mechanical properties and processability, a molded article including the ASA-based resin composition, and a method of manufacturing the molded article. In particular, due to excellent colorability and transparency thereof, the ASA-based resin composition may be applied to high value-added products having non-painting, transparent, high saturation, or special color properties.

BACKGROUND ART

In the case of acrylate compound-styrene-acrylonitrile copolymers (hereinafter referred to as "ASA resins"), no unstable double bonds are included in a polymer. Due to this feature, ASA resins have excellent weather resistance, and thus have been used in various fields such as electrical/electronic parts, construction materials (e.g., vinyl siding), extrusion profiles, and automobile parts.

Recently, there is increasing demand for high value-added outdoor products having non-painting, transparent, high saturation, or special color properties. However, ASA resins have poor colorability and transparency, and thus use of ASA resins in manufacture of such products is limited. Therefore, an ASA resin that meets such market demands needs to be developed.

RELATED ART DOCUMENTS

Patent Documents (Patent Document 1) KR 2009-0095764 A

DISCLOSURE

Technical Problem

Therefore, the present invention has been made in view of the above problems, and it is one object of the present invention to provide an ASA-based resin composition having excellent colorability and transparency even at a processing thickness of a predetermined value or more while having excellent mechanical properties and processability, a molded article including the ASA-based resin composition, and a method of manufacturing the molded article. In particular, due to excellent colorability and transparency thereof, the ASA-based resin composition may be applied to high value-added products having non-painting, transparent, high saturation, or special color properties.

The above and other objects can be accomplished by the present disclosure described below.

Technical Solution

In accordance with one aspect of the present invention, provided are an ASA-based resin composition including 20 to 47% by weight of an acrylate-aromatic vinyl compound-vinyl cyanide compound graft copolymer containing acrylate rubber having an average particle diameter of 50 to 150 nm as a core; 23 to 55% by weight of an alkyl methacrylate-aromatic vinyl compound-vinyl cyanide compound copolymer; and 25 to 45% by weight of a poly(alkyl methacrylate) resin, and a molded article including the ASA-based resin composition.

In accordance with another aspect of the present invention, provided is a method of manufacturing a molded article, the method including kneading and extruding 20 to 47% by weight of an acrylate-aromatic vinyl compound-vinyl cyanide compound graft copolymer containing acrylate rubber having an average particle diameter of 50 to 150 nm as a core, 23 to 55% by weight of an alkyl methacrylate-aromatic vinyl compound-vinyl cyanide compound copolymer, and 25 to % by weight of a poly(alkyl methacrylate) resin under conditions of 200 to 300° C. and 100 to 500 rpm to prepare a pellet; and performing sheet molding or injection molding of the prepared pellet at a molding temperature of 200 to 300° C. to manufacture a molded article.

Advantageous Effects

According to the present invention, an ASA-based resin composition having excellent colorability and transparency even at a processing thickness of a predetermined value or more while having excellent mechanical properties and processability, a molded article including the ASA resin composition, and a method of manufacturing the molded article can be provided. In particular, due to excellent colorability and transparency thereof, the ASA-based resin composition can be applied to high value-added products having non-painting, transparent, high saturation, or special color properties.

BEST MODE

Hereinafter, an ASA-based resin composition, a molded article including the ASA-based resin composition, and a method of manufacturing the molded article will be described in detail.

The present inventors confirmed that an ASA-based resin composition including an acrylate-aromatic vinyl compound-vinyl cyanide compound graft copolymer, an alkyl methacrylate-aromatic vinyl compound-vinyl cyanide compound copolymer, and a poly(alkyl methacrylate) resin in a predetermined content range had excellent colorability and transparency at a processing thickness of 0.5 T or more while maintaining mechanical properties and processability equal or superior to those of conventional ASA resin compositions. Based on these results, the present inventors conducted further studies to complete the present invention.

The ASA-based resin composition of the present invention includes 20 to 47% by weight of an acrylate-aromatic vinyl compound-vinyl cyanide compound graft copolymer containing acrylate rubber having an average particle diameter of 50 to 150 nm as a core, 23 to 55% by weight of an alkyl methacrylate-aromatic vinyl compound-vinyl cyanide compound copolymer, and 25 to 45% by weight of a poly(alkyl methacrylate) resin. Within this range, the ASA resin composition may have excellent mechanical properties and processability and in particular, may have excellent colorability and transparency even at a processing thickness of a predetermined value or more. Thus, the ASA resin composition may be applied to high value-added products having non-painting, transparent, high saturation, or special color properties.

Hereinafter, each component constituting the thermoplastic resin composition of the present invention will be described in detail as follows.

A) Acrylate-Aromatic Vinyl Compound-Vinyl Cyanide Compound Graft Copolymer

For example, the acrylate rubber contained in the graft copolymer (A) of the present invention may have an average particle diameter of 50 to 150 nm, preferably 60 to 140 nm, more preferably 70 to 140 nm, still more preferably 80 to 140 nm. Within this range, a prepared thermoplastic resin composition may have excellent weather resistance, colorability, impact strength, and surface gloss.

In the present description, average particle diameter may be measured by dynamic light scattering, and specifically, may be measured as an intensity value using a Nicomp 380 particle size analyzer (manufacturer: PSS) in a Gaussian mode.

For example, the graft copolymer (A) may be included in an amount of 20 to 47% by weight, preferably 20 to 40% by weight, more preferably 20 to 35% by weight, still more preferably 20 to 30% by weight. Within this range, balance between mechanical strength and fluidity may be excellent, and in particular, transparency, colorability, and weather resistance may be excellent.

For example, the graft copolymer (A) may include 40 to 60% by weight of acrylate rubber, 25 to 45% by weight of an aromatic vinyl compound, and 10 to 20% by weight of a vinyl cyanide compound. Within this range, weather resistance, fluidity, tensile strength, and impact strength may be excellent.

As a preferred example, the graft copolymer (A) may include 45 to 55% by weight of acrylate rubber, 30 to 50% by weight of an aromatic vinyl compound, and 5 to 20% by weight of a vinyl cyanide compound. Within this range, weather resistance, fluidity, tensile strength, and impact strength may be excellent.

As a more preferred example, the graft copolymer (A) may include 45 to 55% by weight of acrylate rubber, 30 to 40% by weight of an aromatic vinyl compound, and 10 to 20% by weight of a vinyl cyanide compound. Within this range, weather resistance, fluidity, tensile strength, and impact strength may be excellent.

In the present description, a polymer including a compound refers to a polymer prepared by polymerizing the compound, and a unit in the polymerized polymer is derived from the compound.

For example, the acrylate may include one or more selected from the group consisting of alkyl acrylates containing an alkyl group having 2 to 8 carbon atoms, preferably alkyl acrylates containing an alkyl group having 4 to 8 carbon atoms. More preferably, the acrylate is butyl acrylate or ethylhexyl acrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

For example, the graft copolymer (A) may have a gel content of less than 90% by weight, 30 to 90% by weight, preferably 50 to 90% by weight. Within this range, mechanical properties such as impact strength and flexural strength may be excellent, and weather resistance may be improved.

For example, the graft copolymer (A) may have a swelling index of 6 to 14, 6 to 12, preferably 6 to 10. Within this range, mechanical properties such as impact strength and flexural strength may be excellent, and weather resistance may be improved.

For example, the graft copolymer (A) may have a grafting degree of 20 to 80%, preferably 25 to 60%, more preferably 25 to 40% Within this range, mechanical properties such as impact strength and flexural strength may be excellent, and weather resistance may be improved.

In the present description, to measure gel content and swelling index, acetone is added to 1 g of graft copolymer powder, stirring is performed at room temperature for 24 hours, centrifugation is performed to obtain a fraction not dissolved in acetone, and then the fraction is dried. Then, the weights of the fraction before and after drying are measured, and gel content and swelling index are calculated by substituting the weight values into the following equations.

Gel content (%)=[Weight after drying after centrifugation/sample weight]×100

Swelling index=Weight before drying after centrifugation/Weight after drying after centrifugation In the present description, to measure grafting degree, resin latex of a graft polymer is coagulated, washed, and dried to obtain powdered resin latex, and then 2 g of the obtained powder is added to 300 ml of acetone, followed by stirring for 24 hours. Then, the stirred solution is separated using an ultracentrifuge, and then methanol is added to the separated acetone solution dropwise to obtain a non-grafted fraction, followed by drying. Thereafter, the weight of the dried non-grafted fraction is measured, and grafting degree is calculated by substituting the measured weight value into the following equation.

Grafting degree (%)=(Weight of grafted monomer (g)/Weight of rubber (g))×100

For example, the graft copolymer (A) may be prepared by emulsion polymerization. Emulsion polymerization commonly practiced in the art to which the present invention pertains may be used in the present invention without particular limitation. As a specific example, the graft copolymer (A) may be prepared by graft-emulsion-polymerizing an aromatic vinyl monomer and a vinyl cyanide monomer onto alkyl acrylate rubber.

For example, the alkyl acrylate rubber included in the graft copolymer (A) may be prepared by emulsion polymerizing alkyl acrylate. As a specific example, the alkyl acrylate rubber may be prepared by mixing alkyl acrylate, an emulsifier, an initiator, a grafting agent, a crosslinking agent, an electrolyte, and water and by emulsion polymerizing the mixture.

For example, the emulsifier is preferably an aqueous solution having a pH of 3 to 9 and containing an alkyl sulfosuccinate metal salt derivative having 12 to 18 carbon atoms, or an alkyl sulfuric ester having 12 to 20 carbon atoms or a sulfonic acid metal salt derivative thereof.

As a specific example, in the aqueous solution having a pH of 3 to 9 and containing an alkyl sulfosuccinate metal salt derivative having 12 to 18 carbon atoms, the alkyl sulfosuccinate metal salt derivative is preferably dicyclohexyl sulfosuccinate sodium salt, dihexyl sulfosuccinate sodium salt, di-2-ethylhexyl sulfosuccinate sodium salt, di-2-ethylhexyl sulfosuccinate potassium salt, or di-2-ethylhexyl sulfosuccinate lithium salt, and the alkyl sulfuric ester having 12 to 20 carbon atoms or the sulfonic acid metal salt derivative thereof is preferably sodium lauryl sulfate, sodium dodecyl sulfate, sodium dodecyl benzene sulfate, sodium octadecyl sulfate, sodium oleic sulfate, potassium dodecyl sulfate, or potassium octadecyl sulfate.

Based on 100 parts by weight of the alkyl acrylate rubber, the emulsifier is preferably used in an amount of 0.1 to 1 part by weight.

For example, the initiator is preferably an inorganic or organic peroxide. Specifically, the initiator is preferably a water-soluble initiator such as potassium persulfate, sodium persulfate, or ammonium persulfate or a fat-soluble initiator such as cumene hydroperoxide or benzoyl peroxide.

Based on 100 parts by weight of the alkyl acrylate rubber, the initiator is preferably used in an amount of 0.05 to 0.2 parts by weight.

In the present description, 100 parts by weight of the alkyl acrylate rubber means the weight of the prepared alkyl acrylate rubber or the total weight of monomers added to prepare the alkyl acrylate rubber.

For example, the grafting agent preferably includes one or more selected from the group consisting of allyl methacrylate, triallyl isocyanurate, triallyl amine, and diallyl amine, and the grafting agent is preferably used in an amount of 0.01 to 0.07 parts by weight based on 100 parts by weight of the alkyl acrylate rubber. Within this range, the objects of the present invention may be achieved more easily.

For example, the crosslinking agent preferably includes one or more selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, and trimethylolmethane triacrylate, and the crosslinking agent is preferably used in an amount of 0.02 to 0.3 parts by weigh based on 100 parts by weight of the alkyl acrylate rubber.

When the grafting agent and the crosslinking agent are used, the elasticity of the alkyl acrylate rubber according to the present invention may be further increased, thereby further improving physical properties such as impact strength.

The electrolyte preferably includes one or more selected from the group consisting of $NaHCO_3$, $Na_2S_2O_7$, and $K_2CO_3$, and the electrolyte is preferably used in an amount of 0.05 to 0.4 parts by weight based on 100 parts by weight of the alkyl acrylate rubber.

In the present description, water serves as a medium in which emulsion polymerization is performed, and is preferably deionized water. The amount of water used may be appropriately selected according to need.

For example, to prepare the alkyl acrylate rubber, the components used to prepare the alkyl acrylate rubber may be continuously fed into a reactor, or may be fed into a reactor in a combination of continuous feed and batch feed, and then emulsion polymerization may be performed under polymerization conditions commonly known in the art to which the present invention pertains. In this case, the alkyl acrylate rubber may be obtained in the form of latex.

For example, immediately after completion of polymerization, the pH of the alkyl acrylate rubber in the form of latex is preferably 5 to 9, more preferably 6 to 8. Within this range, the stability of latex may be excellent.

In the present description, pH may be measured using a pH meter.

The graft copolymer (A) is a graft copolymer prepared by grafting an aromatic vinyl compound-vinyl cyanide compound copolymer onto a backbone of the alkyl acrylate rubber polymer. As a specific example, the graft copolymer (A) may be prepared by mixing the alkyl acrylate rubber with an aromatic vinyl compound, a vinyl cyanide compound, and polymerization additives as necessary and performing emulsion polymerization.

For example, the polymerization additives may include a grafting agent and/or a crosslinking agent. In this case, the grafting agent and the crosslinking agent are the same as those used to prepare the alkyl acrylate rubber, and the content of each of the grafting agent and the crosslinking agent may be determined within the same range as those used to prepare the alkyl acrylate rubber based on 100 parts by weight of total monomers except for rubber.

In the present description, the monomers may include an alkyl acrylate, an alkyl methacrylate, an aromatic vinyl compound, and a vinyl cyanide compound.

When emulsion polymerization of the graft copolymer (A) is performed, in addition to the alkyl acrylate rubber, the aromatic vinyl compound, and the vinyl cyanide compound, an emulsifier, a polymerization initiator, a molecular weight modifier, and water commonly used in the art to which the present invention pertains may be used. In addition, immediately after completion of emulsion polymerization, the prepared graft copolymer may be obtained in the form of latex.

For example, an aqueous solution containing the emulsifier may have a pH of 9 to 13, and the emulsifier is preferably a carboxylic acid metal salt derivative such as a fatty acid metal salt having 12 to 20 carbon atoms and a rosin acid metal salt having 12 to 20 carbon atoms.

For example, the fatty acid metal salt having 12 to carbon atoms preferably includes one or more selected from the group consisting of sodium fatty acid, sodium laurate, sodium oleate, and potassium oleate, and the rosin acid metal salt having 12 to 20 carbon atoms preferably is sodium rosinate, potassium rosinate, or a mixture thereof.

For example, the emulsifier is preferably used in an amount of 1 to 2 parts by weight based on 100 parts by weight of a reaction mixture containing the alkyl acrylate rubber, the aromatic vinyl compound, and the vinyl cyanide compound.

For example, the initiator may be the same as that used to prepare the alkyl acrylate rubber, and is preferably used in an amount of 0.05 to 0.3 parts by weight based on 100 parts by weight of the reaction mixture.

For example, the molecular weight modifier may be t-dodecylmercaptan, n-octylmercaptan, or a mixture thereof, and may be used in an amount of 0.02 to 0.2 parts by weight based on 100 parts by weight of the reaction mixture.

Water used in the present invention is preferably deionized water, and may be used in an amount commonly used in the art to which the present invention pertains.

When graft emulsion polymerization is performed, when the reaction mixture and polymerization additives such as an emulsifier are fed batchwise, the pH of a polymerization system rises temporarily, which makes grafting difficult. In addition, the stability of copolymer particles decreases, and thus the internal structure of the particles becomes uneven. Accordingly, when the graft copolymer (A) is prepared through graft emulsion polymerization, the reaction mixture and polymerization additives are preferably fed continuously, as a specific example, are continuously fed for 1 to 10 hours or 1 to 5 hours within a total reaction time.

It should be noted that polymerization conditions not described herein are obvious to those skilled in the art that polymerization conditions generally known in the art may be appropriately selected.

In the present description, continuous feed is a feed method that is opposite to batch feed, and means continuously feeding for a certain period of time or feeding stepwise within a certain time.

For example, immediately after completion of polymerization, the pH of the graft copolymer (A) in the form of latex is preferably 8 to 11, more preferably 9 to 10.5. Within this range, the stability of latex may be excellent.

As a specific example, the graft copolymer latex (A) may be coagulated at a temperature of 80 to 90° C. or 82 to ° C. under atmospheric pressure using an aqueous calcium chloride solution, aged at a temperature of more than 90° C. and less than or equal to 100° C. or a temperature of 92 to 98° C., dehydrated and washed, and then dried with hot blast at 85 to 95° C. or 88 to 92° C. for 20 minutes to 1 hour or for 30 minutes to 40 minutes to obtain powder.

B) Alkyl Methacrylate-Aromatic Vinyl Compound-Vinyl Cyanide Compound Copolymer

Based on the total weight of the ASA resin composition (A+B+C), the alkyl methacrylate-aromatic vinyl compound-vinyl cyanide compound copolymer of the present invention is preferably included in an amount of 23 to 55% by weight, more preferably 25 to 50% by weight, still more preferably 25 to 45% by weight, most preferably 30 to 40% by weight. Within this range, transparency and colorability may be excellent.

The alkyl methacrylate-aromatic vinyl compound-vinyl cyanide compound copolymer preferably includes 40 to 90% by weight of an alkyl methacrylate, 9 to 40% by weight of an aromatic vinyl compound, and 1 to 20% by weight of a vinyl cyanide compound, more preferably 50 to 85% by weight of an alkyl methacrylate, 12 to 35% by weight of an aromatic vinyl compound, and 3 to 15% by weight of a vinyl cyanide compound, still more preferably 55 to 65% by weight of an alkyl methacrylate, 25 to 35% by weight of an aromatic vinyl compound, and 5 to 10% by weight of a vinyl cyanide compound. Within this range, transparency and colorability may be excellent.

For example, the alkyl methacrylate may be an alkyl methacrylate containing an alkyl group having 1 to 15 carbon atoms. As a specific example, the alkyl methacrylate may include one or more selected from the group consisting of methyl methacrylate, ethyl methacrylate, butyl methacrylate, 2-ethylbutyl methacrylate, 2-ethylhexyl methacrylate, and lauryl methacrylate, preferably an alkyl methacrylate containing a chained alkyl group having 1 to 4 carbon atoms, more preferably methyl methacrylate.

For example, the aromatic vinyl compound may include one or more selected from the group consisting of styrene, α-methylstyrene, m-methylstyrene, p-methylstyrene, and p-tert-butylstyrene, preferably styrene.

For example, the vinyl cyanide compound may include one or more selected from the group consisting of acrylonitrile, methacrylonitrile, ethylacrylonitrile, and isopropylacrylonitrile, preferably acrylonitrile.

The alkyl methacrylate-aromatic vinyl compound-vinyl cyanide compound copolymer preferably has a weight average molecular weight of 10,000 to 150,000 g/mol, more preferably 40,000 to 120,000 g/mol. Within this range, rubber dispersion may be increased, thereby improving impact strength, processability, transparency, and colorability.

In the present description, unless otherwise defined, when measuring weight average molecular weight, powder is dissolved in acetone, a sol fraction dissolved in acetone is extracted, and the extracted sol fraction is dissolved in tetrahydrofuran (THF). Then, weight average molecular weight is measured through gel permeation chromatography (GPC). In this case, weight average molecular weight is obtained as a relative value to a standard polystyrene (PS) specimen.

For example, the alkyl methacrylate-aromatic vinyl compound-vinyl cyanide compound copolymer may be prepared by solution polymerization, bulk polymerization, emulsion polymerization, or suspension polymerization. Solution polymerization, bulk polymerization, emulsion polymerization, and suspension polymerization practiced in the art to which the present invention pertains may be used in the present invention without particular limitation.

As a preferred example, to prepare the alkyl methacrylate-aromatic vinyl compound-vinyl cyanide compound copolymer, 0.01 to 0.5 parts by weight, preferably 0.02 to 0.15 parts by weight, more preferably 0.02 to 0.1 parts by weight of each of one or more of an initiator and a molecular weight modifier may be added to 100 parts by weight in total of an alkyl methacrylate, an aromatic vinyl compound, and a vinyl cyanide compound in the absence of a solvent or in a reaction solvent, and then bulk polymerization or solution polymerization may be performed in a continuous reactor. In this case, economics may be improved, and residual impurities may be reduced.

Reaction solvents for bulk polymerization or solution polymerization commonly used in the art to which the present invention pertains may be used as the reaction solvent of the present invention without particular limitation. For example, the reaction solvent may be aromatic hydrocarbons. The reaction solvent preferably includes one or more selected from the group consisting of toluene, xylene, ethylbenzene, cumene, and tetralin, more preferably toluene.

Preferably, the weight of the graft copolymer (A) is not greater than that of the alkyl methacrylate-aromatic vinyl compound-vinyl cyanide compound copolymer (B). More preferably, the weight ratio (A:B) of the graft copolymer (A) to the alkyl methacrylate-aromatic vinyl compound-vinyl cyanide compound copolymer (B) is 1:1 to 1:2.5, more preferably 1:1 to 1:2. Within this range, balance between mechanical strength and fluidity may be excellent, and in particular, transparency, colorability, and weather resistance may be excellent.

C) Poly(Alkyl Methacrylate) Resin

The poly(alkyl methacrylate) resin (C) of the present invention is preferably included in an amount of 25 to 45% by weight, more preferably 30 to 45% by weight, still more preferably 30 to 40% by weight. Within this range, transparency and colorability may be greatly improved while maintaining mechanical properties and processability equal or superior to those of conventional ASA resin compositions.

For example, the poly(alkyl methacrylate) resin may be a polymer including an alkyl methacrylate containing an alkyl group having 1 to 15 carbon atoms.

The alkyl methacrylate preferably includes one or more selected from the group consisting of methyl methacrylate, ethyl methacrylate, butyl methacrylate, 2-ethylbutyl methacrylate, 2-ethylhexyl methacrylate, and lauryl methacrylate, more preferably an alkyl methacrylate containing a chained alkyl group having 1 to 4 carbon atoms, still more preferably methyl methacrylate.

The poly(alkyl methacrylate) resin preferably has a weight average molecular weight of 50,000 to 200,000 g/mol, more preferably 50,000 to 150,000 g/mol, still more preferably 50,000 to 100,000 g/mol. Within this range, weather resistance, fluidity, tensile strength, impact strength, transparency, and colorability may be excellent.

For example, the poly(alkyl methacrylate) resin may be prepared by adding a crosslinking agent and an initiator to monomers including an alkyl methacrylate and performing bulk polymerization, solution polymerization, suspension polymerization, or emulsion polymerization, preferably suspension polymerization or emulsion polymerization.

Initiators commonly used to prepare a poly(alkyl methacrylate) resin may be used as the initiator of the present invention. For example, azo-based initiators such as 2,2'-azobis 2'4-dimethyl-valeronitrile may be used.

Materials such as solvents and emulsifiers that must be added according to each polymerization method or conditions such as polymerization temperature and polymerization time that must be changed according to each polymerization method may be appropriately selected, without particular limitation as necessary, from materials or conditions commonly used when a poly(alkyl methacrylate) resin is prepared.

ASA-Based Resin Composition

The ASA-based resin composition of the present invention preferably has a total rubber content of 8 to 23% by weight, more preferably 10 to 20% by weight, still more preferably 10 to 17% by weight, most preferably 10 to 15% by weight. Within this range, mechanical properties may be excellent, and in particular, weather resistance, transparency, and colorability may be excellent.

In the present description, an ASA-based resin refers to an alkyl acrylate-aromatic vinyl compound-vinyl cyanide compound copolymer.

Based on 100 parts by weight in total of the acrylate-aromatic vinyl compound-vinyl cyanide compound graft copolymer, the alkyl methacrylate-aromatic vinyl compound-vinyl cyanide compound copolymer, and the poly(alkyl methacrylate) resin, the ASA-based resin composition preferably includes 0.05 to 5 parts by weight of one or more of a lubricant, a heat stabilizer, and a UV stabilizer. Within this range, the intrinsic properties of an ASA-based resin composition may be efficiently expressed without deterioration in the physical properties of the ASA resin composition.

The lubricant is preferably included in an amount of more than 0.3 parts by weight and less than 2 parts by weight, more preferably 0.5 to 1.9 parts by weight, still more preferably 0.9 to 1.5 parts by weight. Within this range, impact strength and fluidity may be excellent.

For example, the lubricant may include one or more selected from the group consisting of ester-based lubricants, metal salt-based lubricants, carboxylic acid-based lubricants, hydrocarbon-based lubricants, and amide-based lubricant, preferably amide-based lubricants, still more preferably alkylene bis(stearamide) containing an alkylene having 1 to 10 carbon atoms. In this case, the intrinsic properties of a lubricant may be well expressed without deterioration in the mechanical properties and thermal stability of a resin.

In the present description, the stearamide-based lubricants may include stearamide and steramid substituents obtained by substituting at least one hydrogen of stearamide with another substituent (e.g., a C1 to C10 alkyl group, halogen, etc.).

Ester-based lubricants, metal salt-based lubricants, carboxylic acid-based lubricants, hydrocarbon-based lubricants, and amide-based lubricant commonly used in the art to which the present invention pertains may be used in the present invention without particular limitation.

For example, the heat stabilizer may include 0.01 to 3 parts by weight of each of one or more selected from the group consisting of amine-based heat stabilizers and phosphorus-based heat stabilizers. Within this range, thermal stability, transparency, and colorability may be excellent.

For example, the amine-based heat stabilizers may include one or more selected from the group consisting of N,N-di-t-butyl hydroxylamine, N,N-distearyl hydroxylamine (DSHA), N,N-diphenyl hydroxylamine (DPHA), N,N-dibenzyl hydroxylamine, N,N-benzylphenyl hydroxylamine, N,N-di(2,4-dimethylphenyl) hydroxylamine, and N,N-naphthyl hydroxylamine. For example, the amine-based heat stabilizer may be included in an amount of 0.01 to 3 parts by weight, preferably 0.05 to 2 parts by weight, more preferably 0.1 to 1 part by weight. Within this range, thermal stability, transparency, and colorability may be excellent.

For example, the phosphorus-based heat stabilizers may include one or more selected from the group consisting of tris(nonylphenyl) phosphite, tris(2,4-di-t-butylphenyl) phosphite (TBPP), 2,4,6-tri-tert-butylphenyl-2-butyl-2-ethyl-1,3-propanediol phosphite, diisodecyl pentaerythritol diphosphite, distearyl pentaerythritol diphosphite, bis(2,4-di-t-butylphenyl) pentaerythritol diphosphite (PEP24), bis(2,4-di-cumylphenyl) pentaerythritol diphosphite, and tetrakis(2,4-di-tert-butylphenyl) [1,1-biphenyl]-4,4'-diyl bisphosphonite. For example, the phosphorus-based heat stabilizer may be included in an amount of 0.01 to 3 parts by weight, preferably 0.05 to 2 parts by weight, more preferably 0.1 to 1 part by weight. Within this range, thermal stability, transparency, and colorability may be excellent.

For example, the UV stabilizer may include 0.1 to 2.5 parts by weight of one or more selected from the group consisting of benzotriazole-based UV absorbers and HALS-based UV stabilizers, preferably 0.1 to 2.0 parts by weight of a benzotriazole-based UV absorber and 0.1 to 2.0 parts by weight of a HALS-based UV stabilizer, more preferably 0.1 to 1.0 part by weight of a benzotriazole-based UV absorber and 0.1 to 1.0 part by weight of a HALS-based UV stabilizer, still more preferably 0.2 to 0.7 parts by weight of a benzotriazole-based UV absorber and 0.2 to 0.7 parts by weight of a HALS-based UV stabilizer, most preferably 0.3 to 0.6 parts by weight of a benzotriazole-based UV absorber and 0.3 to 0.6 parts by weight of a HALS-based UV stabilizer. Within this range, weather resistance may be greatly improved without deterioration in impact strength and fluidity.

For example, the benzotriazole-based UV absorber may be hydroxybenzotriazole, preferably 2-(2'-hydroxyphenyl) benzotriazole. More preferably, the benzotriazole-based UV absorber includes one or more selected from the group consisting of 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3', 5'-bis(α,α-dimethylbenzyl)-2'-hydroxyphenyl)benzotriazole, 2-(3'-tert-butyl-2'-hydroxy-5'-(2-octyloxy-carbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol], and transesterification products of 2-[3'-tert-butyl-5'-(2-methoxycarbonylethyl)-2'-hydroxyphenyl]-2H-benzotriazole and polyethyleneglycol. In this case, weather resistance may be greatly improved without deterioration in impact strength and fluidity.

The HALS-based UV stabilizer preferably includes one or more selected from the group consisting of 1,1-bis(2,2,6,6-tetramethyl-4-piperidyl)succinate, bis(2,2,6,6-tetramethyl-4-piperidyl)sebacate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-N-butyl-3, 5-di-tert-butyl-4-hydroxybenzylmalonate, condensation products of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl) hexamethylene diamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1, 2,3,4-butane tetracarboxylate, 1,1'-(1,2-ethanediyl)-bis(3,3, 5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylene diamine and 4-morpholino-2,6-dichloro-1,3,5-triazine, and reaction products of 7,7,9,9-tetramethyl-2-cycloundecyl-1-oxa-3,8-diaza-4-oxospiro-[4,5]decane and epichlorohydrin, more preferably bis(2,2,6,6-tetramethyl-4-piperidyl)sebacade(bis(2,2,6,6-tetramethyl-4-piperidyl) sebacate), 2-(2H-benzotriazole-2-yl)-4-(-(1,1,3,3-tetramethylbutyl)phenol(2-(2H-benzotriazol-2-yl)-4-(1,1,3,3-tetramethylbutyl)phenol), or a mixture thereof. In this case, weather resistance may be greatly improved without deterioration in impact strength and fluidity.

When necessary, the ASA-based resin composition may further include 0.01 to 5 parts by weight, 0.05 to 3 parts by weight, 0.1 to 2 parts by weight, or 0.5 to 1 part by weight of one or more additives selected from the group consisting of dyes, pigments, colorants, release agents, antistatic agents, antibacterial agents, processing aids, metal deactivators, flame retardants, smoke inhibitors, anti-drip agents, anti-friction agents, and anti-wear agents based on 100 parts by weight described above. Within this range, the effects of additives may be well expressed without deterioration in the intrinsic physical properties of an ASA resin composition.

The ASA-based resin composition preferably has a melt index (220° C., 10 kg) of 8 g/10 min or more, more preferably 8 to 11 g/10 min, still more preferably 9 to 11 g/10 min as measured according to ASTM D1238. Within this range, balance between impact strength, weather resistance, and fluidity may be excellent.

The ASA-based resin composition preferably has an Izod impact strength (¼ inch, 23° C.) of 3 kgf·cm/cm$^2$ or more, more preferably 3 to 8 kgf·cm/cm$^2$, still more preferably 3 to 4 kgf·cm/cm$^2$ as measured according to ASTM D256. Within this range, balance between impact strength, weather resistance, and fluidity may be excellent.

For example, the ASA-based resin composition may have a tensile strength (⅛ inch) of 570 kg/cm$^2$ or more, preferably 570 to 700 kg/cm$^2$, more preferably 580 to 650 kg/cm$^2$, still more preferably 580 to 610 kg/cm$^2$ as measured according to ASTM 638. Within this range, balance between impact strength, tensile strength, weather resistance, and fluidity may be excellent.

For example, the ASA-based resin composition may have a flexural strength of 850 kg/cm$^2$ or more, preferably 850 to 1,000 kg/cm$^2$, more preferably 860 to 950 kg/cm$^2$, still more preferably 870 to 920 kg/cm$^2$ as measured according to ASTM 790. Within this range, balance between impact strength, tensile strength, flexural strength, weather resistance, and fluidity may be excellent.

The ASA-based resin composition preferably has a surface gloss(45°) of 80 or more, more preferably 85 or more or 95 or more as measured according to ASTM D528. Within this range, transparency and colorability may be excellent, and balance between physical properties may be good.

The ASA-based resin composition preferably has a transparency (haze) of 7 or less, more preferably 6 or less, still more preferably 5 or less as measured according to ASTM D1003. Within this range, mechanical properties, processability, transparency, and colorability may excellent.

The ASA-based resin composition preferably has a weather resistance (ΔE) of 1.3 or less, more preferably 1.2 or less as measured using a Weather-Ometer when 6,000 hours have elapsed according to ASTM J1960. Within this range, mechanical properties, processability, colorability, and weather resistance may be excellent.

The method of preparing the ASA-based resin composition preferably includes a step of kneading and extruding 20 to 47% by weight of an acrylate-aromatic vinyl compound-vinyl cyanide compound graft copolymer containing acrylate rubber having an average particle diameter of 50 to 150 nm as a core, 23 to 55% by weight of an alkyl methacrylate-aromatic vinyl compound-vinyl cyanide compound copolymer, and 25 to 45% by weight of a poly(alkyl methacrylate) resin under conditions of 200 to 300° C. and 100 to 500 rpm to prepare pellets.

Extrusion kneaders commonly used in the art to which the present invention pertains may be used in the step of kneading and extruding without particular limitation. For example, a single-screw extruder, a twin-screw extruder, or a Banbury mixer, preferably a twin-screw extruder may be used. In this case, compatibility may be excellent due to uniform dispersion of a composition.

The kneading and extruding are preferably performed at a barrel temperature (temperature condition) of 210 to 300° C., more preferably 210 to 280° C., still more preferably 220 to 250° C. In this case, throughput per unit of time may be adequate, melt kneading may be sufficiently performed, and thermal decomposition of a resin component may be prevented.

The kneading and extruding are preferably performed at a screw speed (rpm) of 150 to 400 rpm, more preferably 100 to 350 rpm, still more preferably 200 to 310 rpm, most preferably 250 to 350 rpm. In this case, throughput per unit of time may be adequate, and thus process efficiency may be improved and excessive cutting may be prevented.

The method of preparing the ASA resin composition shares all the technical characteristics of the above-described ASA-based resin composition. Accordingly, repeated description thereof will be omitted.

Molded Article

The molded article of the present invention may be manufactured using the thermoplastic resin composition of the present invention. In this case, due to increased compatibility, mechanical properties, such as impact strength, transparency, and colorability may be excellent.

For example, the molded article may be an extrusion molded article or an injection molded article. Preferably, the molded article includes housings for home appliances such as air conditioners, vacuum cleaners, washing machines, refrigerators, and TV back covers; housings for OA equipment such as computers, notebooks, monitors, facsimiles, telephones, copiers, and scanners; automotive parts such as automotive interior and exterior materials; interior and exterior materials for construction; materials for toys; leisure products; and interior decoration products, more preferably exterior materials, finishing materials, non-painted products, or extrusion profiles. In this case, by using the thermoplastic resin composition of the present invention, a product having quality superior to that required in the market may be provided.

The molded article preferably has a processing thickness, e.g., surface thickness, of 0.5 T (mm) or more.

Method of Manufacturing Molded Article

Preferably, the method of manufacturing a molded article of the present invention includes a step of kneading and extruding 20 to 47% by weight of an acrylate-aromatic vinyl compound-vinyl cyanide compound graft copolymer containing acrylate rubber having an average particle diameter of 50 to 150 nm as a core, 23 to 55% by weight of an alkyl methacrylate-aromatic vinyl compound-vinyl cyanide compound copolymer, and 25 to 45% by weight of a poly(alkyl methacrylate) resin under conditions of 200 to 300° C. and 100 to 500 rpm to prepare a pellet; and a step of performing sheet molding or injection molding of the prepared pellet at a molding temperature of 200 to 300° C. to manufacture a molded article. In this case, the molded article may have excellent colorability and transparency even at a processing thickness of a predetermined value or more, and thus the molded article may be applied to high value-added ASA-based resin products having non-painting, transparent, high saturation, or special color properties.

As a preferred example, the step of preparing the molded article may include a step of performing sheet molding of the prepared pellets at a molding temperature of 180 to 300° C. As a more preferred example, the step of preparing the molded article may include a step of performing sheet molding at a molding temperature of 180 to 300° C. under a molding pressure of 50 to 300 kgf/cm². In this case, a large molded sheet having excellent transparency and colorability may be easily manufactured.

The molding temperature is preferably 200 to 230° C., more preferably 210 to 220° C. Within this range, a large molded sheet having excellent transparency and colorability may be easily manufactured.

The molding pressure is preferably 190 to 270 kgf/cm², more preferably 200 to 250 kgf/cm². Within this range, a large injection-molded article having high impact strength may be easily manufactured.

As another preferred example, the step of manufacturing the molded article may include a step of injection molding the prepared pellets under conditions of an injection temperature of 200 to 260° C., an injection pressure of 60 to 100 bar, and a holding pressure of 25 to bar. In this case, a large injection-molded article having excellent transparency and colorability may be easily manufactured.

The injection temperature is preferably 200 to 230° C., more preferably 210 to 220° C. Within this range, a large injection-molded article having excellent transparency and colorability may be easily manufactured.

The injection pressure is preferably 70 to 90 bar, more preferably 75 to 85 bar. Within this range, a large injection-molded article having high impact strength may be easily manufactured.

The holding pressure is preferably 30 to 50 bar, more preferably 35 to 45 bar. Within this range, a large-area injection-molded article having high impact strength may be easily manufactured.

In describing the thermoplastic resin composition, the method of preparing the thermoplastic resin composition, and the molded article according to the present invention, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples below are as follows.

A) Graft copolymer (core: 50% by weight of a butylacrylate polymer-derived unit having an average particle diameter of 150 nm, shell: 35% by weight of a styrene-derived unit, and 15% by weight of an acrylonitrile-derived unit) prepared by emulsion polymerization B) SAMMA resin prepared by bulk polymerization: A SAMMA resin was prepared by the following method.

Polymerization was performed at a temperature of 140° C. in a first reactor and polymerization was performed at a temperature of 150° C. in a second reactor while feeding, at a rate of 14 L/hr into a 26 L reactor, a polymerization solution prepared by adding 0.02 parts by weight of 1,1-bis(t-butylperoxy)-3,3,5-trimethylcyclohexane, 0.08 parts by weight of n-dodecyl mercaptan, and 0.1 parts by weight of Irgacure (1,3,5-tris(4-tert-butyl-3-hydroxy-2,6-dimethylbenzyl)-1,3,5-triazine-2,4,6-(1H,3H,5H)-trione) as a hindered phenolic antioxidant to a mixed solution containing 20 parts by weight of toluene, 24 parts by weight of styrene, 50 parts by weight of methyl methacrylate, and 6 parts by weight of acrylonitrile. When polymerization rate reached about 60% or more, unreacted monomers and the reaction medium were removed in a volatilization tank at 215° C. to prepare a styrene-acrylonitrile-methyl methacrylate (SAMMA) resin in the form of pellets. The weight average molecular weight of the prepared SAMMA resin was 70,000 g/mol.

C) PMMA resin prepared by bulk polymerization: A PMMA resin was prepared by the following method.

100 parts by weight of methyl methacrylate, 200 parts by weight of distilled water, 0.3 parts by weight of polyvinyl alcohol as a suspending agent, and 2.0 parts by weight of n-octyl mercaptan were fed into a nitrogen-substituted reactor batchwise. Then, the temperature inside the reactor was raised to 80° C., 0.05 parts by weight of AIBN as an initiator was added thereto to initiate reaction, and the temperature inside the reactor was maintained at 80° C. to perform polymerization for 90 minutes. Thereafter, the temperature of the reactor was raised to 110° C. for 30 minutes to perform additional polymerization. The obtained beads were washed using a dehydrator and dried in a fluidized bed dryer at 80° C. for 2 hours. The weight average molecular weight of the prepared PMMA resin was 100,000 g/mol.

Examples 1 to 5 and Comparative Examples 1 to 6

1 part by weight of an EBS resin (Sunkoo Co.) as a lubricant, 0.5 parts by weight of each of SONGNOX 1076 and SONGNOX 1680 (Songwan Co.) as antioxidants, and 0.5 parts by weight of each of Tinuvin 770 (BASF Co.) and Sunsorb 329 (Sunfine global Co.) as UV stabilizers were added to the compositions and contents shown in Table 1 below, and the mixture was kneaded and extruded at 230° C. and 150 rpm in a twin-screw extruder to prepare pellets. Component C used in Comparative Example 2 was a PMMA resin with a weight average molecular weight of 40,000 g/mol, and Component C used in each of Comparative Examples 3 to 6 was the same as the Component C used in Example 1. The melt index of the prepared pellets was measured. In addition, a 0.5 T sheet was prepared using the prepared pellets at a molding temperature of 220° C. and molding pressure of 200 kgf/cm². Surface gloss, Tt, and haze were measured using the prepared sheet. In addition, the prepared pellets were injected at a molding temperature of 220° C., an injection pressure of 50 bar, and a holding pressure of 35 bar to prepare a specimen for measuring physical properties. Impact strength, tensile strength, flexural strength, colorability, and weather resistance were measured using the prepared specimen.

Test Examples

The properties of the pellets, the sheets, and the specimens prepared in Examples 1 to 5 and Comparative Examples 1 to 6 were measured according to the following methods, and the results are shown in Table 1 below.

Rubber content (% by weight): Rubber content was measured according to FT-IR.
Surface gloss (%): Surface gloss was measure at 45° according to ASTM D528.
Izod impact strength (kgf·cm/cm): Izod impact strength was measured according to ASTM 256.
Flexural strength (kgf/cm²): Flexural strength was measured according to ASTM 790.
Tensile strength (kgf/cm²): Tensile strength was measured according to ASTM 638.
Melt index (MI): Melt index was measured using the prepared pellet under conditions of 220° C. and 10 kg according to ASTM D1238.
Transparency (light diffusivity and light transmittance): The haze value and total light transmittance (Tt) of a 0.5 mm thick sheet were measured according to ASTM D-1003. Transparency becomes better as the haze value decreases, whereas transparency becomes better as light transmittance increases.
Surface hardness: Surface hardness was measured according to ASTM D785.
Colorability: The L value of a specimen was measured using a color difference meter (Color-Eye 7000A, X-Rite Co.) in a CIELAB mode. As the L value increases, the degree to which the color of a white plate located behind the specimen is projected onto the specimen increases, i.e., colorability increases.
Weather resistance (ΔE): Color was measured using a weather resistance analyzer (Weather-Ometer) when 6,000 hours have elapsed under the ASTM J1960 conditions, and the measured color was compared with an initial color. A small ΔE value indicates that the degree of color change is insignificant. Thus, weather resistance becomes better as the ΔE value decreases.

TABLE 1

| (Parts by weight) | Example 1 | Example 2 | Example 3 | Example 4 | Example 5 |
|---|---|---|---|---|---|
| A | 30 | 30 | 20 | 40 | 46 |
| B | 40 | 30 | 40 | 30 | 24 |
| C | 30 | 40 | 40 | 30 | 30 |
| Rubber content | 15 | 15 | 10 | 20 | 23 |
| Melt index (MI) | 10.7 | 9.7 | 15 | 9 | 8 |
| Impact strength | 3.5 | 3.2 | 2.3 | 4.3 | 4.5 |
| Tensile strength | 600 | 590 | 650 | 500 | 450 |
| Flexural strength | 900 | 880 | 960 | 800 | 700 |
| Tt | 86 | 88 | 88 | 83 | 83 |
| Haze | 5 | 4 | 4 | 6 | 7 |
| Surface gloss | 100 | 106 | 105 | 95 | 93 |
| Surface hardness | 110 | 110 | 109 | 95 | 90 |
| Colorability | 80 | 81 | 80 | 76 | 76 |
| Weather resistance (ΔE) | 1.1 | 1.2 | 1.1 | 1.6 | 1.7 |

TABLE 2

| (Parts by weight) | Comparative Example 1 | Comparative Example 2 | Comparative Example 3 | Comparative Example 4 | Comparative Example 5 | Comparative Example 6 |
|---|---|---|---|---|---|---|
| A | 30 | 30 | 65 | 10 | 30 | 56 |
| B | 70 | 40 | 15 | 40 | 65 | 20 |
| C | — | 30 | 20 | 50 | 5 | 24 |
| Rubber content | 15 | 15 | 32.5 | 5 | 15 | 28 |
| Melt index (MI) | 12 | 12 | 14 | 18 | 16 | 6 |
| Impact strength | 3.4 | 3.4 | 9 | 2.1 | 3.5 | 8.5 |

TABLE 2-continued

| (Parts by weight) | Comparative Example 1 | Comparative Example 2 | Comparative Example 3 | Comparative Example 4 | Comparative Example 5 | Comparative Example 6 |
|---|---|---|---|---|---|---|
| Tensile strength | 540 | 560 | 380 | 700 | 590 | 420 |
| Flexural strength | 840 | 860 | 590 | 1060 | 885 | 660 |
| Tt | 80 | 85 | 82 | 88 | 83 | 84 |
| Haze | 17 | 9.1 | 10 | 8 | 15 | 9.5 |
| Surface gloss | 98 | 96 | 75 | 97 | 97 | 90 |
| Surface hardness | 109 | 105 | 65 | 109 | 105 | 86 |
| Colorability | 75 | 76 | 75 | 78 | 76 | 75 |
| Weather resistance (ΔE) | 1.4 | 1.6 | 2.3 | 1.5 | 1.4 | 1.9 |

As shown in Tables 1 and 2, it can be confirmed that compared to Comparative Examples 1 to 6 not according to the present invention, the ASA resin compositions (Examples 1 to 5) according to the present invention have excellent transparency (haze), colorability, and weather resistance while having mechanical strength, such as impact strength and tensile strength, and processability represented by MI, which are equal or superior to those of Comparative Examples 1 to 6. In particular, it can be confirmed that Examples 1 to 3 having a preferred composition ratio and rubber content have excellent transparency (haze), colorability, and weather resistance. Accordingly, it can be confirmed that the ASA resin composition according to the present invention has excellent colorability and transparency even at a processing thickness of a predetermined value or more while maintaining mechanical properties and processability equal or superior to those of conventional ASA compositions, and thus the ASA resin composition is applicable to high value-added products having non-painting, transparent, high saturation, or special color properties.

The invention claimed is:

1. A resin composition, comprising:
    20 to 30% by weight of an aromatic vinyl compound-vinyl cyanide compound graft copolymer comprising acrylate rubber having an average particle diameter of 50 to 150 nm as a core;
    30 to 40% by weight of an alkyl methacrylate-aromatic vinyl compound-vinyl cyanide compound copolymer; and
    30 to 40% by weight of a poly(alkyl methacrylate) resin,
    wherein the aromatic vinyl compound-vinyl cyanide compound graft copolymer comprises 40 to 60% by weight of the acrylate rubber, 25 to 45% by weight of a first aromatic vinyl compound, and 10 to 20% by weight of a first vinyl cyanide compound,
    wherein the alkyl methacrylate-aromatic vinyl compound-vinyl cyanide compound copolymer comprises 45 to 65% by weight of an alkyl methacrylate, 25 to 35% by weight of a second aromatic vinyl compound, and 10 to 20% by weight of a second vinyl cyanide compound,
    wherein the resin composition has a total rubber content of 10 to 15% by weight, as measured by Fourier-transform infrared spectroscopy (FTIR),
    wherein a weight ratio of the graft copolymer to the alkyl methacrylate-aromatic vinyl compound-vinyl cyanide compound copolymer is 1:1 to 1:2,
    wherein the resin composition has an Izod impact strength (¼ inch, 23° C.) of 3 to 8 kgf·cm/cm$^2$ according to ASTM D256, and
    wherein the resin composition has a weather resistance of 1.3 or less according to ASTM J1960.

2. The resin composition according to claim 1, wherein the alkyl methacrylate-aromatic vinyl compound-vinyl cyanide compound copolymer has a weight average molecular weight of 10,000 to 150,000 g/mol, as measured by gel permeation chromatography (GPC).

3. The resin composition according to claim 1, wherein the poly(alkyl methacrylate) resin is a polymer comprising an alkyl methacrylate containing an alkyl group having 1 to 15 carbon atoms.

4. The resin composition according to claim 1, wherein the poly(alkyl methacrylate) resin has a weight average molecular weight of 50,000 to 200,000 g/mol, as measured by gel permeation chromatography (GPC).

5. The resin composition according to claim 1, further comprising one or more of a lubricant, a heat stabilizer, and a UV stabilizer in an amount of 0.05 to 5 parts by weight.

6. A molded article manufactured using the resin composition according to claim 1.

7. The molded article according to claim 6, wherein the molded article is an exterior material, a finishing material, a non-painted product, or an extrusion profile.

8. A method of manufacturing a molded article, the method comprising:
    kneading and extruding the resin composition according to claim 1 under conditions of 200 to 300° C. and 100 to 500 rpm to prepare a pellet; and
    manufacturing a molded article by performing sheet molding or injection molding of the prepared pellet at a molding temperature of 200 to 300° C.

\* \* \* \* \*